(12) United States Patent
Wu et al.

(10) Patent No.: US 10,884,324 B2
(45) Date of Patent: Jan. 5, 2021

(54) MOVING APPARATUS AND ADJUSTING METHOD THEREOF

(71) Applicant: Coretronic Corporation, Hsin-Chu (TW)

(72) Inventors: Chih-Wen Wu, HsinChu (TW); Chien-Tsai Chueh, HsinChu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/402,192

(22) Filed: May 2, 2019

(65) Prior Publication Data

US 2020/0004114 A1    Jan. 2, 2020

(30) Foreign Application Priority Data

Jul. 2, 2018    (CN) .......................... 2018 1 0705791

(51) Int. Cl.
  *G03B 21/14*      (2006.01)
  *G02B 7/02*       (2006.01)
(52) U.S. Cl.
  CPC ........... *G03B 21/142* (2013.01); *G02B 7/028* (2013.01)
(58) Field of Classification Search
  CPC .... G03B 21/142; G03B 21/147; G02B 7/028; G02B 7/005; G02B 7/023
  See application file for complete search history.

(56) References Cited

U.S. PATENT DOCUMENTS

| 2016/0202447 | A1* | 7/2016 | Gutierrez | ............. | G02B 13/001 |
| | | | | | 359/824 |
| 2017/0108705 | A1* | 4/2017 | Yu | ........................ | G02B 13/009 |

FOREIGN PATENT DOCUMENTS

| CN | 106896464 | 6/2017 |
| TW | 201030445 | 8/2010 |

* cited by examiner

*Primary Examiner* — Michelle M Iacoletti
*Assistant Examiner* — Danell L Owens
(74) *Attorney, Agent, or Firm* — JCIPRNET

(57) ABSTRACT

The disclosure provides a moving apparatus for a projector. The projector includes a body, a processing unit and a projection lens. The moving apparatus includes a base having a through-base opening. At least one moving stage movably disposed on a front side surface of the base along a plane and has at least one through-stage opening aligned with the through-base opening. At least one magnetic component disposed on a carrier board, wherein a projection position of the projection lens is positioned by the at least one magnetic board through magnetic attraction. The at least one magnetic component is electrically connected to the processing unit.

19 Claims, 11 Drawing Sheets

MOVING APPARATUS AND ADJUSTING METHOD THEREOF

CROSS-REFERENCE TO RELATED APPLICATION

This application claims the priority benefit of China application serial no. 201810705791.6, filed on Jul. 2, 2018. The entirety of the above-mentioned patent application is hereby incorporated by reference herein and made a part of this specification.

BACKGROUND OF THE DISCLOSURE

Field of the Disclosure

The disclosure is related to a moving apparatus, and particularly to a moving apparatus used for projector and adjusts position of projection lens.

Description of Related Art

The projection lens of known projector is installed on a shifting module, followed by installing and electrically connecting the shifting module to an engine body of the projector. Thereafter, user may use a direction adjusting button on the projector or a controller to control the shifting module to drive the projection lens to move. When the user completes adjusting the projection position of the projection lens, pressing on the adjusting button or the controller is released such that the projection lens is fixed at a position.

However, the conventional shifting module, in order to avoid that interference is generated in the process of assembling detailed components and to ensure that the projection lens is moved smoothly, a gap with a particular size is reserved between the detailed components. But, after the projector is operated for a period of time, a large amount of heat is generated, which causes the temperature inside the projector to increase. On this occasion, the shifting module and the detailed components are deformed in the gap due to thermal expansion effect. As a result, the position of the shifting module configured for positioning is shifted, which consequently causes the projection position of the projection lens to be shifted as well. Even after the temperature inside the projector is decreased, the expansion caused to the material used for the shifting module and the detailed components is an irregular phenomenon, and thus the projection lens is not likely to be restored to the originally adjusted projection position. Therefore, every time when the projector is used by the user, the user needs to re-adjust the projection position of the projection lens again, which causes inconvenience when using the projection.

The information disclosed in this "Description of Related Art" section is only for enhancement of understanding of the "Description of Related Art" section of the described technology and therefore it may contain information that does not form the prior art that is already known to a person of ordinary skill in the art. Further, the information disclosed in the "Description of Related Art" section does not mean that one or more problems to be resolved by one or more embodiments of the disclosure were acknowledged by a person of ordinary skill in the art.

SUMMARY OF THE DISCLOSURE

An embodiment of the disclosure provides a moving apparatus configured for adjusting a projection lens of a projector, and the projection position of the projection lens is positioned through magnetic attraction, thereby avoiding that the projection position is shifted due to change of interior temperature.

The objectives and advantages of the disclosure may be further understood in the technical features disclosed in the disclosure. To achieve one or a part or all the objectives or other objectives, an embodiment of the disclosure provides a moving apparatus disposed in a projector. The projector includes a body, a processing unit and a projection lens. The moving apparatus includes a base, at least one moving stage, a carrier board and at least one magnetic component. The base has a through-base opening. The at least one moving stage is movably disposed on the base and has at least one through-stage opening aligned with the through-base opening. The at least one magnetic component is disposed on the carrier board, wherein the projection position of the projection lens is positioned by the at least one magnetic component through magnetic attraction, and the at least one magnetic component is electrically connected to the processing unit.

To achieve one or a part or all the objectives or other objectives, an embodiment of the disclosure provides an adjusting method of a moving apparatus for adjusting a projection lens of a projector. The moving apparatus includes a base, at least one moving stage, a carrier board and at least one magnetic component. The projection lens is connected to the at least one moving stage. The at least one magnetic component is electrically connected to a processing unit of the projector and the at least one moving stage is controlled by the processing unit. The adjusting method includes the following steps. The processing unit is driven. The processing unit demagnetizes the at least one magnetic component. The at last one magnetic component is disposed on the carrier board. The processing unit drives the at least one moving stage to generate movement. The at least one moving stage drives the projection lens to move. Driving of the processing unit is disabled. The processing unit magnetizes the at least one magnetic component. The at least one magnetic component generates magnetic force to position the projection lens.

Based on the above, the moving apparatus of the disclosure is provided with a magnetic component configured for magnetically attracting the at least one moving stage or the base, thereby positioning the projection lens. The projection lens is driven by the at least one moving stage to move to be adjusted to the desired projection position. Before the at least one moving stage is moved, the plurality of magnetic components are demagnetized such that the at least one moving stage can be moved freely. After the at least one moving stage stops moving, the plurality of magnetic components are magnetized to magnetically attract the at least one moving stage or the base such that the at least one moving stage is fixed, thereby positioning the projection lens. Since the disclosure uses magnetic attraction of the plurality of magnetic components to position the projection lens, it is possible to avoid that the projection position is shifted due to change of temperature.

To provide a further understanding of the aforementioned and other features and advantages of the invention, exemplary embodiments, together with the reference drawings, are described in detail below.

Other objectives, features and advantages of the present invention will be further understood from the further technological features disclosed by the embodiments of the present invention wherein there are shown and described

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
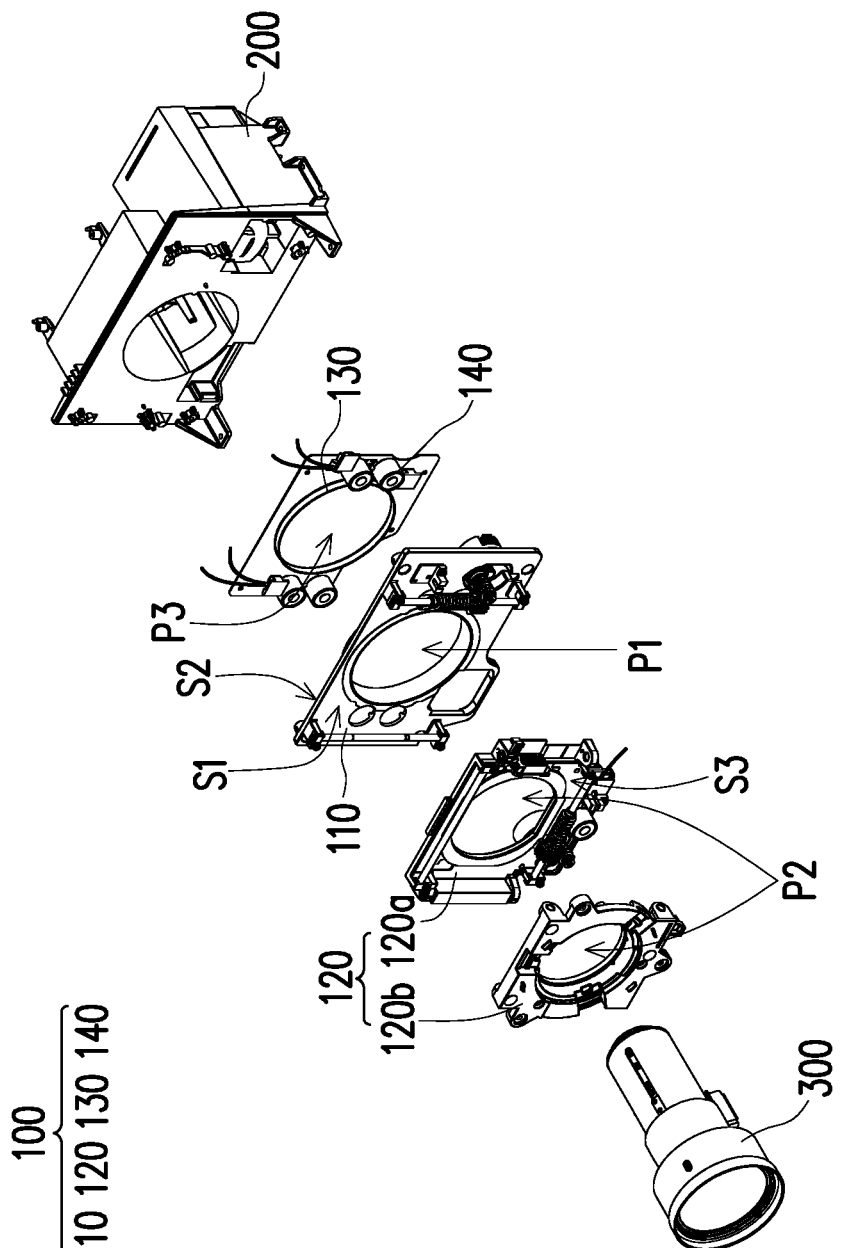
FIG. 1A is a schematic explosive view of a moving apparatus of a projector connected to a projection lens and a body according to an embodiment of the disclosure.
Figure 1B:
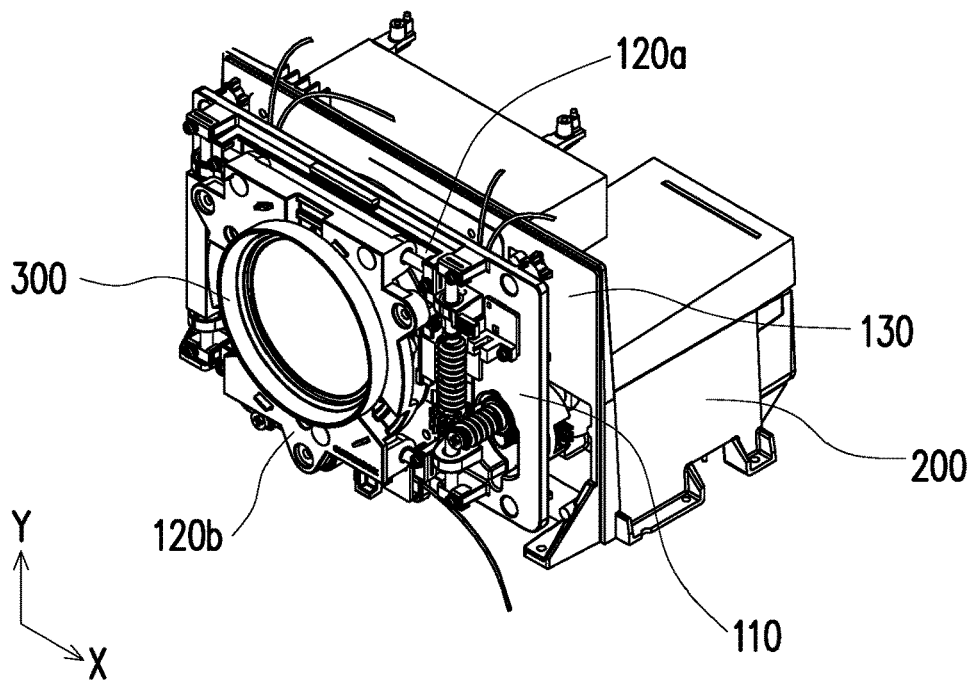
FIG. 1B is a schematic perspective view of an appearance of FIG. 1A.
Figure 1C:
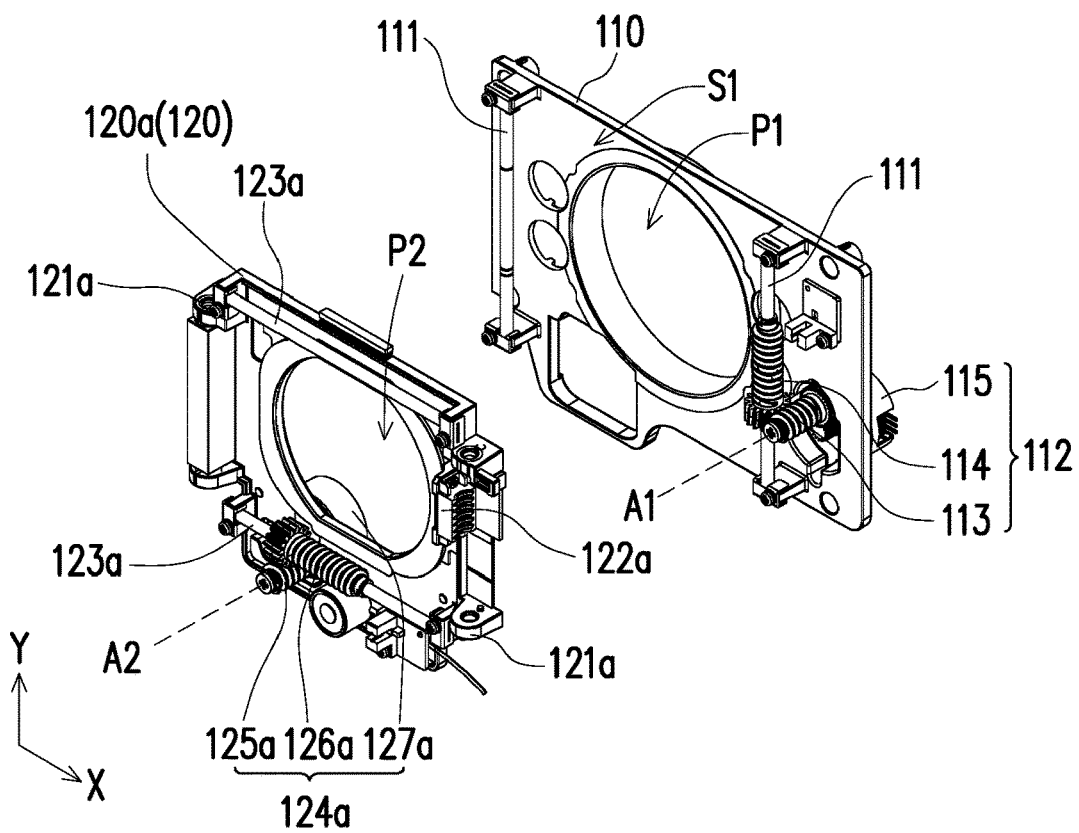
FIG. 1C is an enlarged schematic view of a base and a horizontal moving stage of the moving apparatus in FIG. 1A.
Figure 1D:
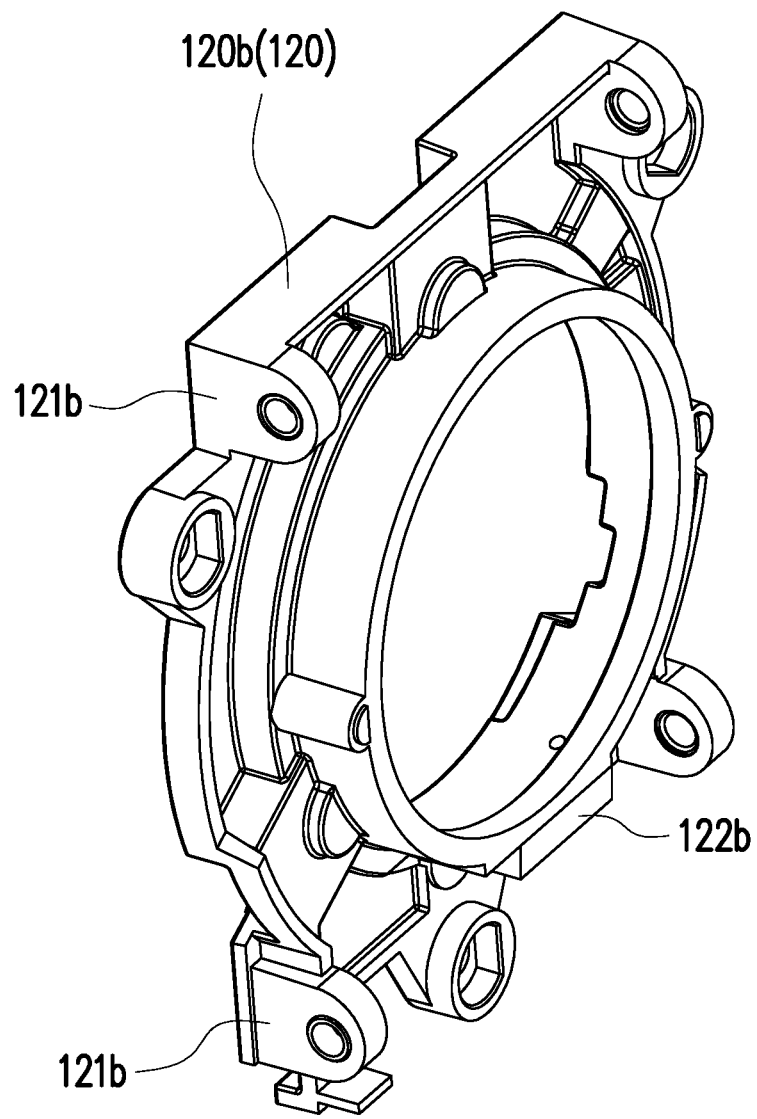
FIG. 1D is a schematic view of a vertical moving stage of the moving apparatus in FIG. 1A along another direction.
Figure 1E:
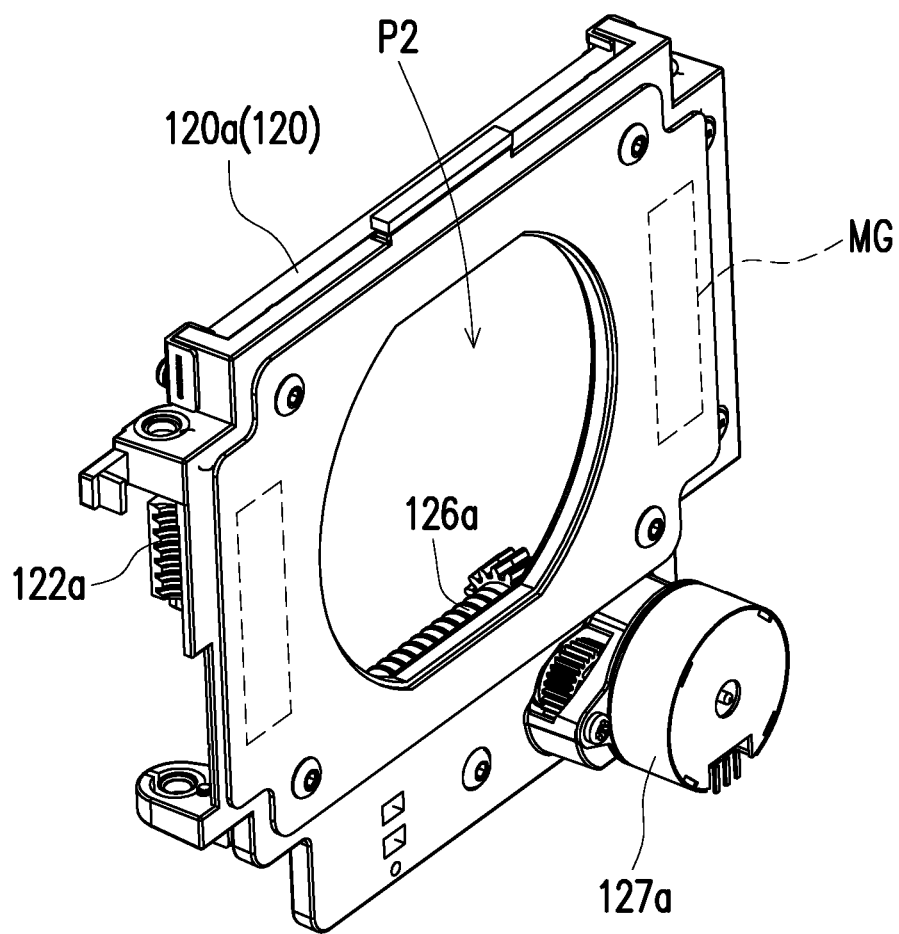
FIG. 1E is a schematic view of a horizontal moving stage of the moving apparatus in FIG. 1A along another direction.
Figure 1F:
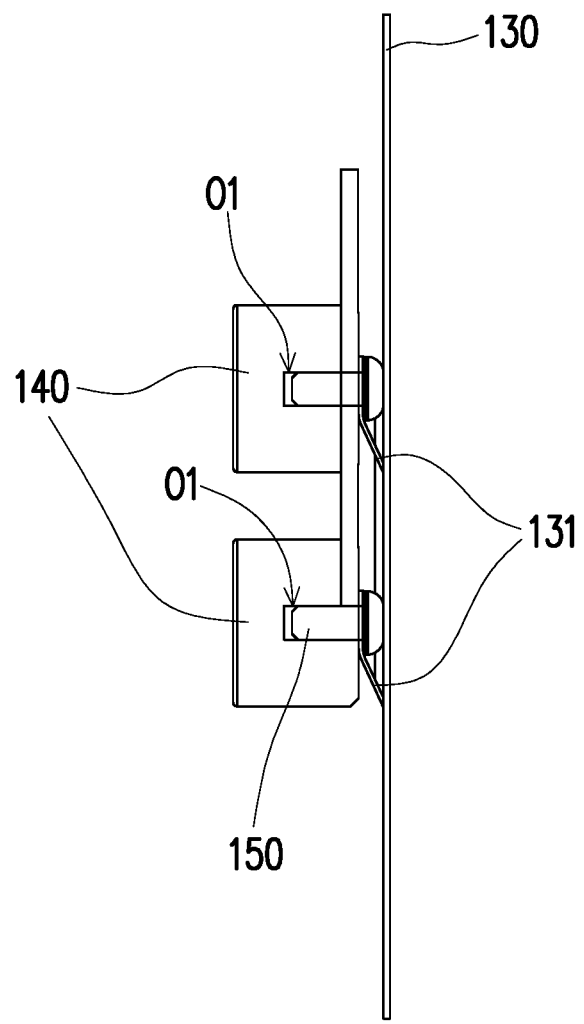
FIG. 1F is a plane schematic side view of a carrier board and a magnetic component of the moving apparatus in FIG. 1A.

FIG. 1A is a schematic explosive view of a moving apparatus of a projector connected to a projection lens and a body according to an embodiment of the disclosure. FIG. 1B is a schematic perspective view of an appearance of FIG. 1A. FIG. 1C is an enlarged schematic view of a base and a horizontal moving stage of the moving apparatus in FIG. 1A. FIG. 1D is a schematic view of a vertical moving stage of the moving apparatus in FIG. 1A along another direction. FIG. 1E is a schematic view of a horizontal moving stage of the moving apparatus in FIG. 1A along another direction. FIG. 1F is a plane schematic side view of a carrier board and a magnetic component of the moving apparatus in FIG. 1A.

Referring to FIG. 1A and FIG. 1B, a moving apparatus 100 of the embodiment is configured for connecting a body 200 and a projection lens 300 to constitute a portion of a projector 10. The projector 10 may be connected to various electronic devices such as a computer, a video player, a game player and so on through a corresponding port, thereby converting a digital signal into a static image or a dynamic image to be projected on an external screen or a wall surface through a projection lens. Specifically, the projector 10 further includes a processing unit (not shown) on a mainboard.

The moving apparatus 100 of the embodiment is disposed on the body 200. The moving apparatus 100 includes a base 110, at least one moving stage 120, a carrier board 130 and at least one magnetic component 140. The center of the base 110 has a through-base opening P1. The at least one moving stage 120 is movably disposed on a front side surface S1 of the base 110 and has at least one through-stage opening P2 aligned with the through-base opening P1, and the at least one moving stage 120 includes a metal material that is magnetically attractable. The carrier board 130 is disposed on a rear side surface S2 opposite to the front side surface S1 of the base 110 and has a through-carrier board opening P3. The through-carrier board opening P3 is aligned with the through-base opening P1 and the at least one through-stage opening P2, which shows that the through-carrier board opening P3, the through-base opening P1, the at least one through-stage opening P2 have the same axial center position. The at least one magnetic component 140 is disposed on the carrier board 130 and faces the base 110.

In the embodiment, the at least one magnetic component 140 is exemplified as a plurality of magnetic components 140; the disclosure provides no limitation to the number of the magnetic component 140. In other embodiments, it is possible that only one magnetic component 140 is used. In the embodiment, the plurality of magnetic components 140 are respectively disposed on both sides of the through-carrier board opening P3 and through the base 110 while being in contact with the at least one moving stage 120. In the embodiment, the plurality of magnetic components 140 is respectively disposed through the base 110 and in contact with the moving stage 120. Specifically, the magnetic component 140 is, for example, an electromagnet which can be switched to a magnetized or demagnetized state through power-on/power-off operation.

In the embodiment, specifically, the projection lens 300 is fixed and connected to the at least one moving stage 120 to generate movement along with the at least one moving stage 120. The projection lens 300 passes through the at least one through-stage opening P2, the through-base opening P1 and the through-carrier board opening P3 in sequence to enter the body 200, and is aligned with an image component in the body 200 to enlarge an image or a frame projected by the image component. The image component is, for example, a light valve. The light valve may be a reflective liquid crystal on silicon (LCOS) or digital micro-mirror device (DMD) and etc.; a transmissive spatial light modulator such as a transparent liquid crystal panel.

Additionally, the magnetic component 140 is electrically connected to the processing unit on the mainboard of the projector 10. The at least one moving stage 120 may be controlled by the processing unit of the projector 10. The magnetic component 140 is controlled by the processing unit to be switched to a magnetized or demagnetized state. The at least one moving stage 120 may also be controlled by the processing unit to generate movement. Specifically, the processing unit is, for example, a processor or a processing circuit. The processor or the processing circuit is, for example, a central processing unit (CPU), or other programmable general purpose or specific purpose microprocessor, a digital signal processor (DSP), a programmable controller, an application specific integrated circuit (ASIC), a programmable logic device (PLD), other similar devices or a combination of the above.

Specifically, when the at least one moving stage 120 is controlled by the processing unit to generate movement relative to the base 110, the processing unit demagnetizes the magnetic component 140 and releases the magnetic attraction between the magnetic component 140 and the at least one moving stage 120. When the at least one moving stage 120 is moved to a specific position of the base 110, the processing unit magnetizes the magnetic component 140 to restore the magnetism of the magnetic component 140, thereby magnetically attracting the at least one moving stage 120 and fixing the position of the projection lens 300.

Referring to FIG. 1A to FIG. 1C, in the embodiment, the at least one moving stage 120 includes a vertical moving stage 120a and the horizontal moving stage 120b configured respectively to generate a linear two-dimensional movement along a vertical direction Y and a horizontal direction X. The vertical moving stage 120a is disposed at the front side surface S1 of the base 110 and is movable relative to the base 110 along the vertical direction Y. The horizontal moving stage 120b is disposed on the front side surface S3 of the vertical moving stage 120a, and is movable relative to the base 110 along the horizontal direction X.

The detailed structure and the method of generating movement of the vertical moving stage 120a and the horizontal moving stage 120b are described below.

It should be indicated that, in other embodiments of the disclosure, the at least one moving stage 120 is, for example, a single moving stage configured to make the projection lens 300 to generate a one-dimensional movement. In other embodiments of the disclosure, the movement of the at least one moving stage 120 is generated by user's manual operation. The disclosure does not limit that the driving operation is performed by the processor or the processing circuit of the projector.

Referring to FIG. 1A to FIG. 1D, the front side surface S1 of the base 110 has two first guide bars 111 and a vertical driving mechanism 112 spaced apart from each other. The two first guide bars 111 are arranged on left and right sides of the through-base opening P1 in parallel and disposed along the vertical direction Y. The vertical driving mechanism 112 is disposed on one of the first guide bars 111. The vertical moving stage 120a has two first bushings 121a and a first transmission base 122a. The two first bushings 121a are respectively sleeved on the two first guide bars 111, and the vertical driving mechanism 112 is engaged with the first transmission base 122a. When the processing unit activates the vertical driving mechanism 112, it drives the vertical moving stage 120a through the first transmission base 122a such that the two first bushings 121a generate movement in the vertical direction Y along the two first guide bars 111.

Specifically, the vertical driving mechanism 112 includes a first switch gear 113, a first rotating gear 114 and a first motor 115. The first switch gear 113 is pivotably disposed on the front side surface S1 of the base 110 and an axial direction A1 of the first switch gear 113 is perpendicular to the base 110. The first switch gear 113 is engaged with the first transmission base 122a. The first rotating gear 114 is pivotably sleeved on one of the first guide bars 111 and engaged with the first switch gear 113. The first motor 115 is connected to and drives the first switch gear 113, thereby driving the first rotating gear 114 to be pivoted relative to the first guide bar 111. Thereafter, the first rotating gear 114 drives the first transmission base 122a to generate linear displacement, and finally the vertical moving stage 120a is moved vertically along the two first guide bars 111 through the two first bushings 121a.

The vertical moving stage 120a has two second guide bars 123a and a horizontal driving mechanism 124a spaced apart from each other. The two second guide bars 123a are disposed on upper and lower sides of the through-stage opening P2 in parallel and disposed along the horizontal direction X. The horizontal driving mechanism 124a is disposed on one of the second guide bars 123a. The horizontal moving stage 120b has two second bushings 121b and a second transmission base 122b. The two second bushings 121b are respectively sleeved on the two second guide bars 123b, and the horizontal driving mechanism 124a is engaged with the second transmission base 122b. When the processing unit activates the horizontal driving mechanism 124a, and drives the horizontal moving stage 120b through the second transmission base 122b, such that the two second bushings 121b generate a movement in the horizontal direction Y along the two second guide bars 123a.

Specifically, the horizontal driving mechanism 124a includes a second switch gear 125a, a second rotating gear 126a and a second motor 127a. The second switch gear 125a is pivotably disposed on the vertical moving stage 120a and an axial direction A2 of the second switch gear 125a is perpendicular to the vertical moving stage 120a. The second switch gear 125a is engaged with the second transmission base 122b. The second rotating gear 126a is pivotably sleeved on one of the second guide bars 123a and engaged with the second switch gear 125a. The second motor 127a is connected to and drives the second switch gear 125a, thereby driving the second rotating gear 126a to be pivoted relative to the second guide bar 123a. Thereafter, the second rotating gear 126a drives the second transmission base 122b to generate a linear displacement, and finally the horizontal moving stage 120b is moved horizontally along the two second guide bars 123a through the two second bushiness 121b.

Specifically, when the processing unit is driven, the processing unit transmits current to the magnetic component 140 to achieve demagnetization through power-on operation. Thereafter, the processing unit activates the at least one driving mechanism (vertical driving mechanism 112 or horizontal driving mechanism 124a) to drive the at least one moving stage (vertical moving stage 120a or horizontal moving stage 120b). When the driving of the processing unit is disabled, the processing unit stops driving the at least one driving mechanism, and then the process unit stops transmitting the current to the at least one magnetic component to achieve magnetization through power-off operation. Alternatively, the processing unit stops transmitting current to the at least one magnetic component to achieve magnetization through power-off operation, and then the processing unit stops driving the at least one driving mechanism.

Figure 2A:
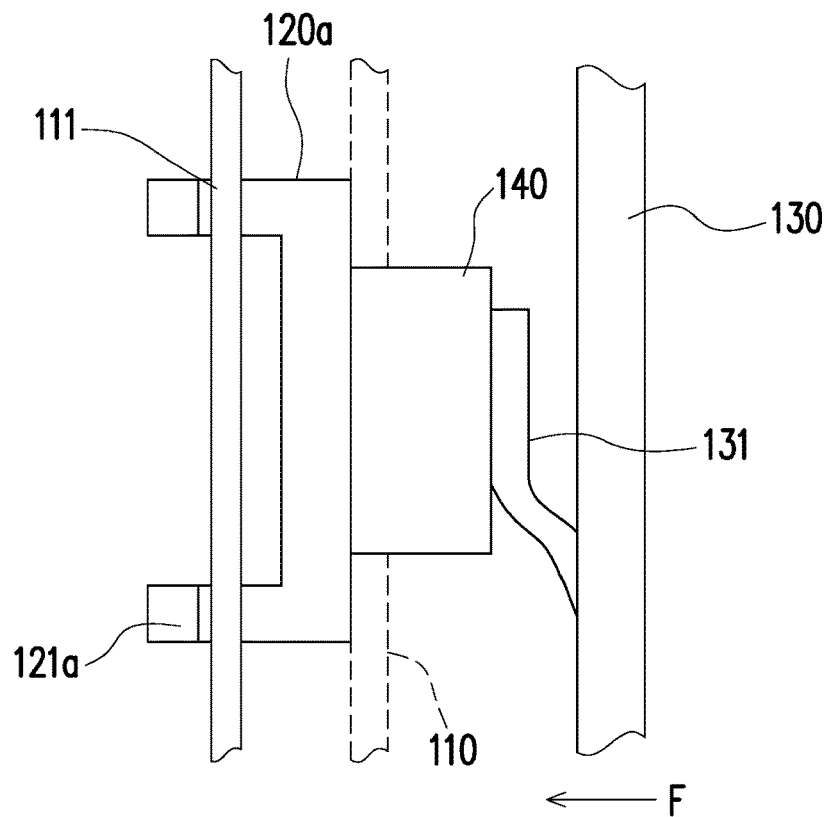
FIG. 2A and FIG. 2B are schematic views showing a pushing action of a carrier board and a magnetic component of a moving apparatus of the disclosure.
Figure 2B:
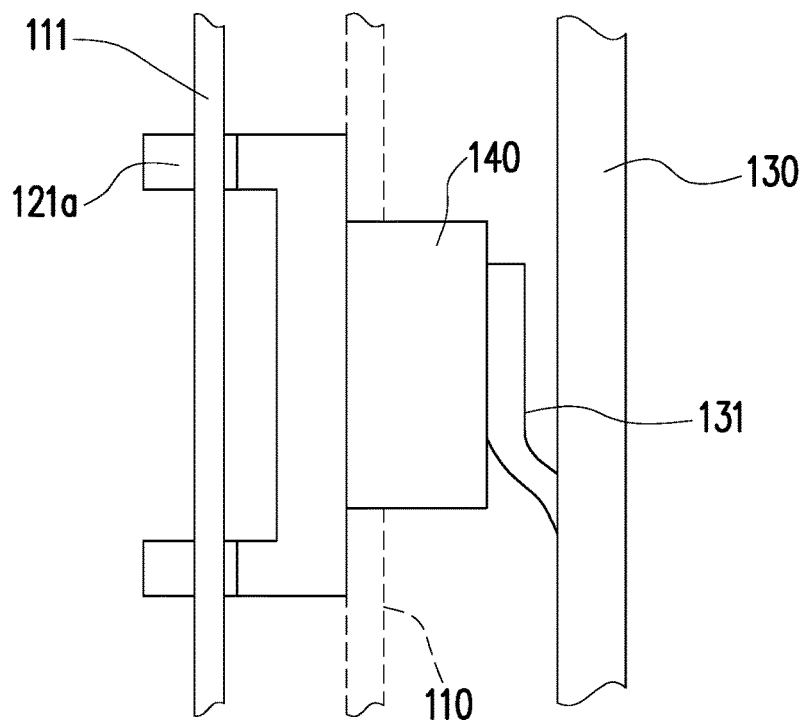
Figure 2C:
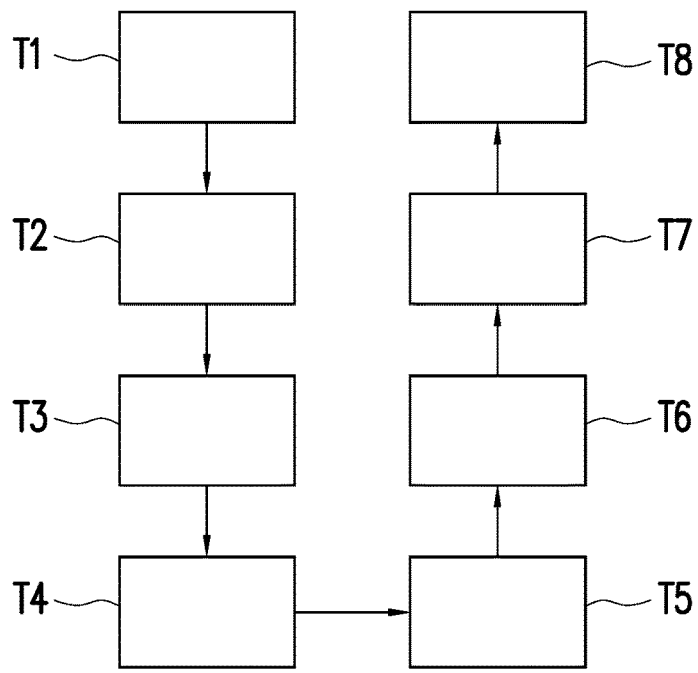
FIG. 2C is flowchart of an adjusting method of a moving apparatus of the disclosure.

FIG. 2A and FIG. 2B are schematic views showing a pushing action of a carrier board and a magnetic component of a moving apparatus of the disclosure. FIG. 2C is flowchart of an adjusting method of a moving apparatus of the disclosure. Referring to FIG. 2A, FIG. 2B, FIG. 1E and FIG. 1F, the vertical moving stage 120a has a plurality of magnetic portions MG, which are respectively disposed on both sides of the through-stage opening P2, on one side surface facing the base 110. The plurality of magnetic components 140 pass through the base 110 and respectively abut against/are in contact with each of the magnetic portions MG. Each of the magnetic portions MG is, for example, formed by using magnetic metal material. In other embodiments, the whole moving stage may be directly formed by using the metal material having magnetism instead of providing the magnetic portion corresponding to the plurality of magnetic components.

In other embodiments of the disclosure, the at least one moving stage 120 has a single magnetic portion MG disposed on one side of the through-stage opening P2, and locates on one side surface facing the base 110. The magnetic component 140 passes through the base 110 and respectively abuts against/are in contact with the magnetic portion MG. Referring to FIG. 1A, FIG. 1F, FIG. 2A-FIG. 2B, the carrier board 130 is, for example, formed of a metallic sheet metal and has at least one elastic structure 131. The at least one elastic structure 131 is respectively formed on both sides of the through-carrier board opening P3 and protruded while being extended toward the substrate 110. The elastic structure 131 is, for example, an elastic sheet or a spring. The material of the elastic structure 131 may be the same as the material of the carrier board 130, the disclosure is not limited thereto. The magnetic component 140 is disposed corresponding to the elastic structure 131. Specifically, the magnetic component 140 is respectively disposed on the corresponding elastic structure 131, and the elastic structure 131 provides a pushing force F to the magnetic component 140 to move toward the vertical moving stage 120a, such that the magnetic component 140 is always flatly attached to the vertical moving stage 120a. In this manner, no matter whether the gap between the plurality of first bushings 121a and the plurality of first guide bars 111 of the vertical moving stage 120a is close to the carrier board 130 or away from the carrier board 130, the elastic structure 131 can ensure that the magnetic component 140 is in contact with the vertical moving stage 120a through the pushing force F to avoid that a minor gap is formed between the magnetic component 140 and the vertical moving stage 120a, which causes attenuation of magnetic attraction effect of the magnetic component 140 and leads to shifted position.

Specifically, referring to FIG. 1F, a fixing component 150 is further included. The fixing component 150 is, for example, a screw. The magnetic component 140 has a screw hole O1 and the elastic structure 131 has a locking hole. The fixing component 150 respectively passes through the locking hole and screwed within the screw hole O1 of the corresponding magnetic component 140. In other embodiments, the magnetic component may be fixed on the elastic structure by adhesion, locking, clamping or other connecting approach. The disclosure is not limited to the fixing approach.

More embodiments are provided below for further explanation. It is to be explained that, the following embodiment has adopted component notations and part of the contents from the previous embodiment, wherein the same notations are used for representing the same or similar components, and descriptions of the same technical contents are omitted. The descriptions regarding the omitted part may be referred to the previous embodiments, and thus are not repeated herein.

Figure 2D:
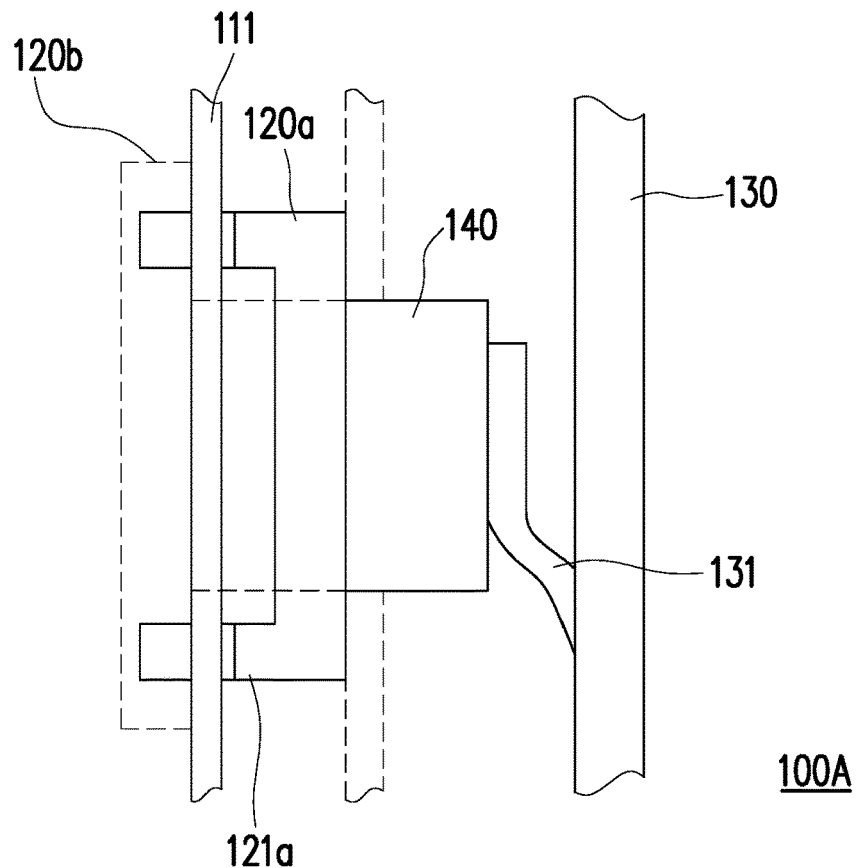
FIG. 2D is a schematic view showing connection of a carrier board and a magnetic component according to another embodiment of the disclosure.

FIG. 2D is a schematic view showing connection of a carrier board and a magnetic component according to another embodiment of the disclosure. Referring to FIG. 2D, a moving apparatus 100A in the embodiment is similar to the moving apparatus 100 in the foregoing embodiment, and the difference between the two is that the magnetic component 140 of the moving apparatus 100A is sleeved on the base 110 and the vertical moving stage 120a while being abutted against/in contact with the horizontal moving stage 120b.

An adjusting method of the moving apparatus of the embodiment is described below. Referring to FIG. 1A, FIG. 1B, FIG. 2A and FIG. 2C. The moving apparatus 100 is configured to adjust the projection lens 300 of the projector 10. In the disclosure, the user (manually) or a determining system (automatically) (e.g., an image-capturing device such as a camera) of the projector itself may determine/detect whether the position to which the image is projected is consistent with the predetermined position.

First of all, a step T1 is performed. The processing unit is driven to adjust the projection direction of the projection lens 300, for example, by pressing an adjusting button of the projector 10, an adjusting button of a controller or a determining system of the projector, thereby generating a control signal to be transmitted to the processing unit of the projector 10. The processing unit of the projector 10 is driven to adjust the projection direction of the projection lens 300. Next, a step T2 is performed. The processing unit controls the magnetic component 140, and demagnetizes the magnetic component 140. When the processing unit is driven, the processing unit transmits the current to the magnetic component 140 to achieve the demagnetization state through power-on operation, such that the magnetic component 140 no longer has magnetism and is not attracted to the at least one moving stage 120 or the base 110.

Thereafter, a step T3 is performed. The processing unit activates the second motor 127a or the first motor 115 of the at least one driving mechanism (horizontal driving mechanism 124a and vertical driving mechanism 112), thereby driving the at least one moving stage 120 and the projection lens 300 to generate movement. Specifically, the at least one moving stage 120 includes the vertical moving stage 120a and the horizontal moving stage 120b. The vertical moving stage 120a is movable relative to the base 110 along the vertical direction Y. The horizontal moving stage 120b is movable relative to the vertical moving stage 120a along the horizontal direction X.

Next, a step T4 is performed. The projection lens 300 is moved by the at least one moving stage 120. On this occasion, a step T5 and a step T6 are performed. Driving of the processing unit is disabled and no control signal is generated. Without providing power to the magnetic component 140 through the processing unit, the magnetic component 140 is magnetized. When the processing unit stops activating the second motor 127a and the first motor 115 of the at least one driving mechanism (horizontal driving mechanism 124a and vertical driving mechanism 112), the processing unit stops transmitting current to the magnetic component 140 to achieve magnetization through power-off operation. Finally, a step T7 and a step T8 are performed. The magnetic component 140 generates magnetic force to magnetically attract the at least one moving stage 120 or the base 110 to position the projection lens 300.

Figure 3A:
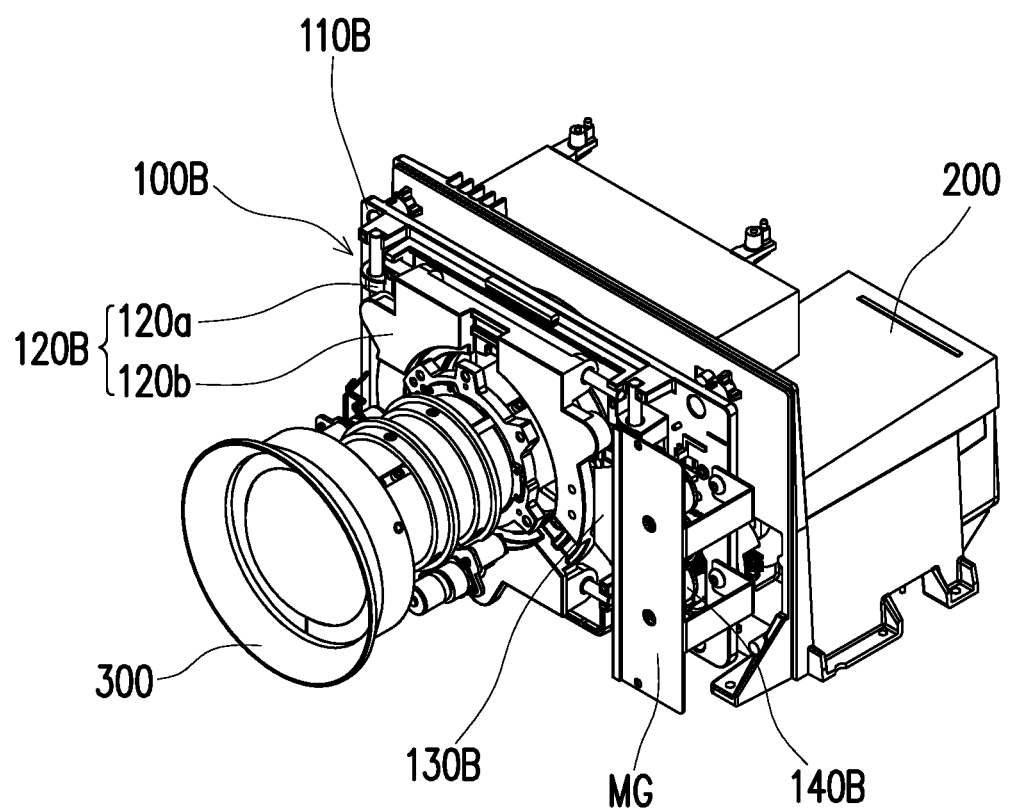
FIG. 3A is a schematic perspective view of an appearance of a moving apparatus connected to a projection lens and a body according to another embodiment of the disclosure.
Figure 3B:
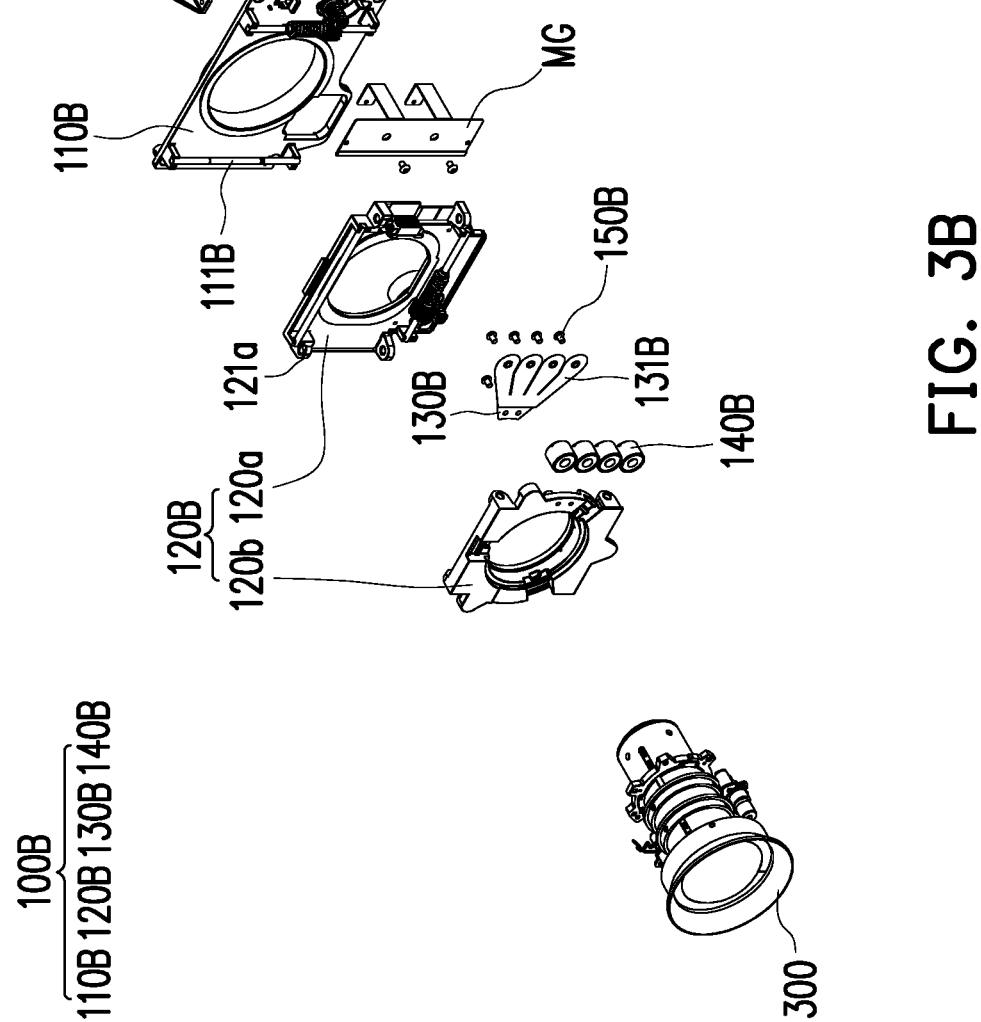
FIG. 3B is a schematic explosive view of components of the moving apparatus in FIG. 3A.
Figure 3C:
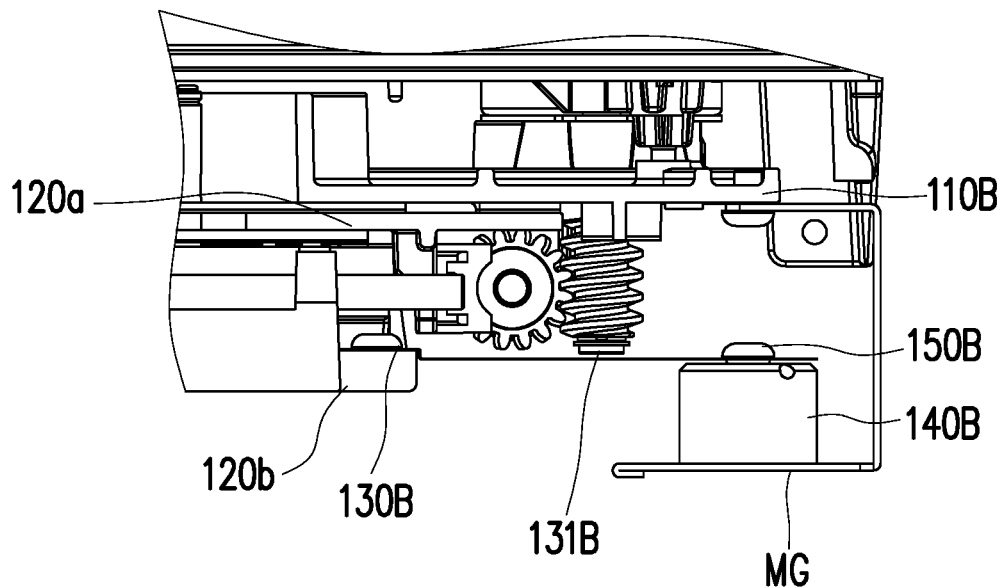
FIG. 3C and FIG. 3E are schematic top views of some components of the moving apparatus in FIG. 3A.
Figure 3D:
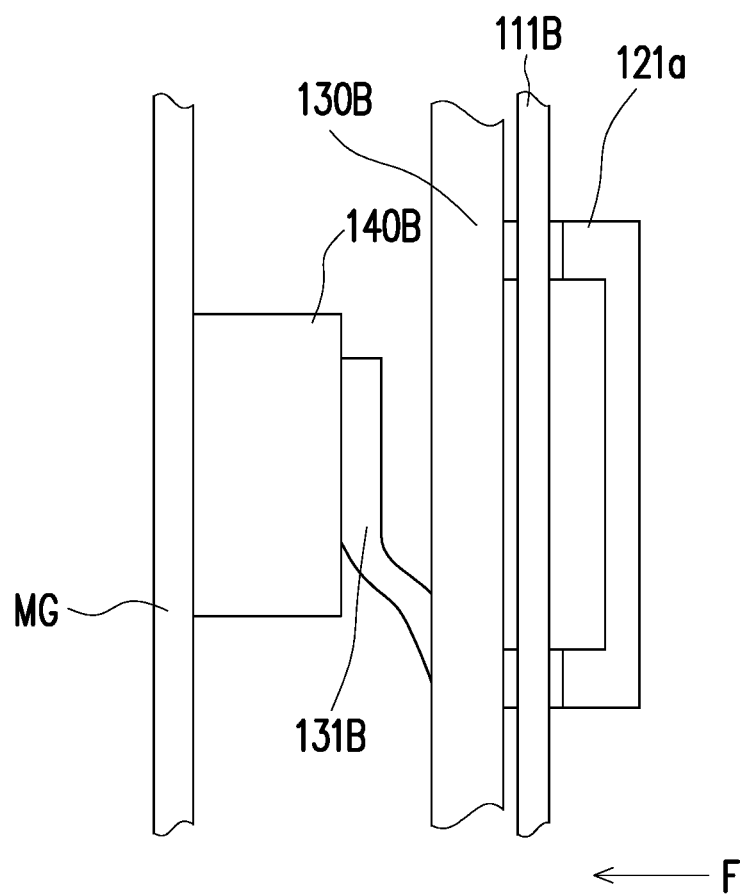
FIG. 3D and FIG. 3F are respectively schematic views showing pushing action of a carrier board and a magnetic component in FIG. 3C and FIG. 3E.
Figure 3E:
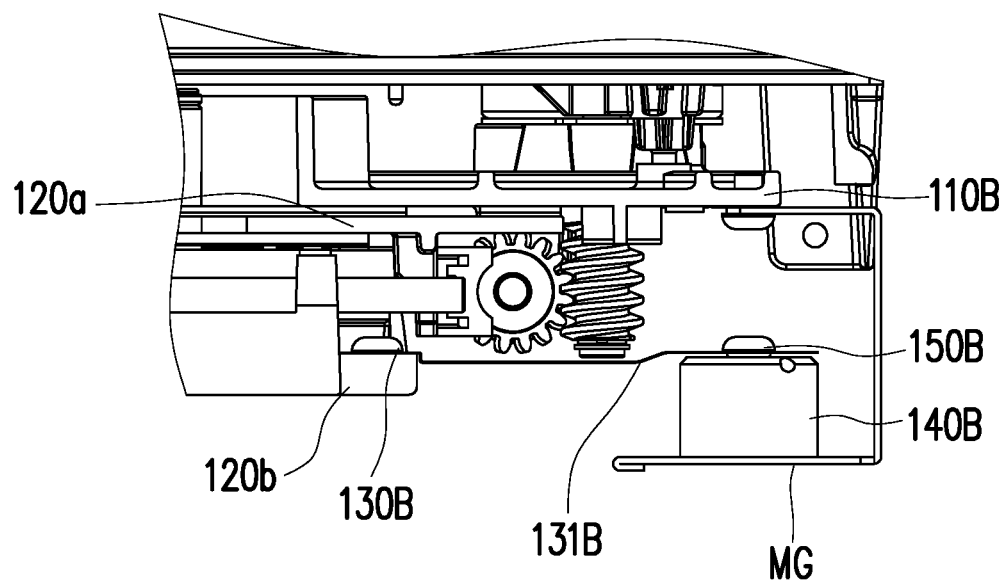
Figure 3F:
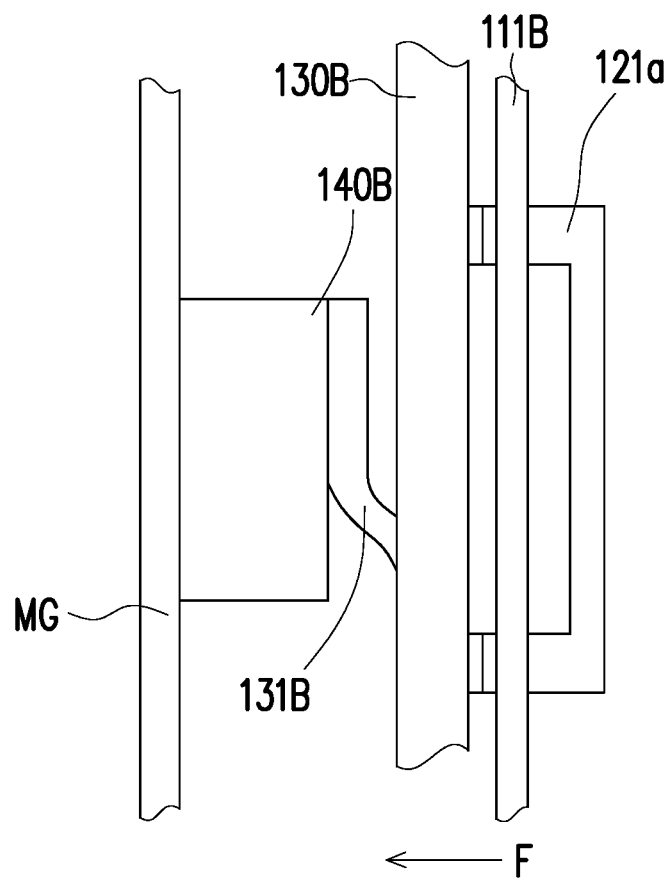

FIG. 3A is a schematic perspective view of an appearance of a moving apparatus connected to a projection lens and a body according to another embodiment of the disclosure. FIG. 3B is a schematic explosive view of components of the moving apparatus in FIG. 3A. FIG. 3C and FIG. 3E are schematic top views of some components of the moving apparatus in FIG. 3A. FIG. 3D and FIG. 3F are respectively schematic views showing pushing action of a carrier board and a magnetic component in FIG. 3C and FIG. 3E.

Referring to FIG. 3A and FIG. 3B, a moving apparatus 100B in the embodiment is similar to the moving apparatus 100 in FIG. 1A, and the technical difference between the two is that a carrier board 130B of the moving apparatus 100B is disposed on the at least one moving stage 120.

Specifically, the carrier board 130B of the moving apparatus 100B is disposed on the horizontal moving stage 120b, and the carrier board 130B has a plurality of elastic structures 131B extended outward. The plurality of elastic structures 131B are arranged in a fan shape. The plurality of magnetic components 140B are respectively secured on the plurality of corresponding elastic structures 131B through a plurality of locking components 150B. Each of the magnetic components 140B are disposed on a side surface of each of the elastic structures 131B away from the body 200.

Additionally, the magnetic portion MG of the moving apparatus 100B in the embodiment is formed of an additional plate. Specifically, the magnetic portion MG is connected to the base 110B through a plurality of supporting legs and disposed in front of the base 110B in parallel. The side surface of the magnetic portion MG facing the base 110B abuts against and is in contact with the plurality of magnetic components 140B.

Referring to FIG. 3A to FIG. 3F, the plurality of elastic structures 131B are formed on one side of the carrier board 130B such that the plurality of magnetic components 140B on the carrier board 130B abut against the magnetic portion MG. The elastic structure 131B provides a pushing force F to the magnetic component 140B to move toward the horizontal moving stage 120b such that the plurality of magnetic components 140B are always flatly attached to the magnetic portion MG of the base 110B. In this manner, no matter whether the gap between the second bushing 121b and the second guide bar 111B of the horizontal moving stage 120b is close to the carrier board 130B or away from the carrier board 130B, the elastic structure 131B can push the magnetic component 140B to be in contact with the magnetic portion MG through the pushing force F to avoid that a minor gap is formed between the magnetic component 140B and the magnetic portion MG, which causes attenuation of magnetic attraction effect of the plurality of magnetic components 140B and causes the positions of the moving stage 120b and the projection lens 300 to be shifted. Besides, by positioning the projection position of the projection lens through magnetic attraction, it is possible to prevent the projection position from being shifted due to change of interior temperature.

Base on the above, the moving apparatus according to an embodiment of the disclosure is provided with a magnetic component configured for magnetically attracting the at least one moving stage, thereby positioning the projection lens. The projection lens is driven by using the at least one moving stage to move to be adjusted to the desired projection position. Before the at least one moving stage is moved, the magnetic components are demagnetized such that the at least one moving stage can be moved freely. After the at least one moving stage stops moving, the magnetic components are magnetized to magnetically attract the at least one moving stage such that the at least one moving stage is fixed, thereby the goal of positioning the projection lens is achieved. Since the disclosure uses magnetic attraction of the magnetic components to position the projection lens, it is possible to avoid that the projection position is shifted due to change of temperature.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A moving apparatus, disposed in a projector, wherein the projector comprises a body, a processing unit and a projection lens, and the moving apparatus comprising:
a base, having a through-base opening;
at least one moving stage, movably disposed on the base, and having at least one through-stage opening aligned with the through-base opening;
a carrier board; and
at least one magnetic component, disposed on the carrier board, wherein a projection position of the projection lens is positioned by the at least one magnetic component through magnetic attraction, and the at least one magnetic component is electrically connected to the processing unit, wherein the carrier board has a through-carrier board opening, the through-carrier board opening is aligned with the through-base opening and the at least one through-stage opening, the carrier board is disposed on a rear side surface opposite to a front side surface of the base, and the at least one magnetic component is disposed through the base and abuts against the at least one moving stage, wherein the projection lens is connected to the at least one moving stage and passes through the at least one through-stage opening, the through-base opening and the through-carrier board in sequence and enters the body, the at least one moving stage is controlled by the processing unit.

2. The moving apparatus of claim 1, wherein before the at least one moving stage generates a movement relative to the base, the processing unit demagnetizes the at least one magnetic component, and after the at least one moving stage is moved, the processing unit magnetizes the at least one magnetic component.

3. The moving apparatus of claim 1, wherein the at least one moving stage is movably disposed on the front side surface of the base, and the at least one moving stage includes a magnetically attractable metal material.

4. The moving apparatus of claim 1, wherein the carrier board has at least one elastic structure, the at least one magnetic component is respectively disposed corresponding to the at least one elastic structure.

5. The moving apparatus of claim 4, further comprising a fixing component, wherein the at least one magnetic component has a screw hole and the at least one elastic structure has a locking hole, the fixing component respectively passes through the locking hole and screwed into the screw hole of the corresponding magnetic component.

6. The moving apparatus of claim 1, wherein the at least one moving stage further comprises a vertical moving stage and a horizontal moving stage, the vertical moving stage is disposed on the front side surface of the base, and is movable relative to the base along a vertical direction, the horizontal moving stage is disposed on a front side surface of the vertical moving stage, and is movable relative to the vertical moving stage along a horizontal direction.

7. The moving apparatus of claim 6, wherein the at least one magnetic component passes through the base and the vertical moving stage and abuts against the horizontal moving stage.

8. The moving stage of claim 6, wherein the base has two first guide bars and a vertical driving mechanism spaced apart from each other, the two first guide bars are arranged on left and right sides of the through-base opening in parallel, the vertical driving mechanism is disposed on one of the first guide bars, the vertical moving stage has two first bushings and a first transmission base, the two first bushings are respectively sleeved on the two first guide bars, the vertical driving mechanism is engaged with the first transmission base and drives the vertical moving stage through the first transmission base, such that the two first bushings generate movement in a vertical direction along the two first guide bars.

9. The moving apparatus of claim 8, wherein the vertical driving mechanism includes a first switch gear, a first rotating gear and a first motor, the first switch gear is pivotably disposed on the base and an axial direction of the first switch gear is perpendicular to the base, the first switch gear is engaged with the first transmission base, the first rotating gear is pivotably sleeved on one of the first guide bars and engaged with the first switch gear, the first motor is connected to and drives the first switch gear.

10. The moving apparatus of claim 6, wherein the vertical moving stage has two second guide bars and a horizontal driving mechanism spaced apart from each other, the two second guide bars are arranged on upper and lower sides of the through-stage opening in parallel, the horizontal driving mechanism is disposed on one of the second guide bars, the horizontal moving stage has two second bushings and a second transmission base, the two second bushings are respectively sleeved on the two second guide bars, and the horizontal driving mechanism is engaged with the second transmission base and drives the horizontal moving stage through the second transmission base, such that the two second bushings generate movement in a horizontal direction along the two second guide bars.

11. The moving apparatus of claim 10, wherein the horizontal driving mechanism includes a second switch gear, a second rotating gear and a second motor, the second switch gear is pivotably disposed on the vertical moving stage and an axial direction of the second switch gear is perpendicular to the vertical moving stage, the second switch gear is engaged with the second transmission base, the second rotating gear is pivotably sleeved on one of the second guide bars and engaged with the second switch gear, the second motor is connected to and drives the second switch gear.

12. The moving apparatus of claim 1, wherein the at least one moving stage has a magnetic portion, the at least one magnetic component abuts against the magnetic portion.

13. The moving apparatus of claim 1, wherein the base has a magnetic portion, the at least one magnetic component abuts against the magnetic portion.

14. The moving apparatus of claim 1, wherein the carrier board is disposed on the at least one moving stage, the carrier board has a plurality of elastic structures extended outward, the plurality of elastic structures are arranged in a fan shape.

15. The moving apparatus of claim 1, wherein a magnetic portion is connected to the base through a plurality of supporting legs and disposed in front of the base in parallel, a side surface of the magnetic portion facing the base abuts against and is in contact with the at least one magnetic component.

16. An adjusting method of a moving apparatus, configured to adjust a projection lens of a projector, wherein the moving apparatus comprises a base, at least one moving stage, a carrier board and at least one magnetic component, wherein the projection lens is connected to the at least one moving stage, the at least one magnetic component is electrically connected to a processing unit of the projector and the at least one moving stage is controlled by the processing unit, the adjusting method comprising:

driving the processing unit;

demagnetizing the at least one magnetic component through the processing unit, the at least one magnetic component disposed on the carrier board;

driving the at least one moving stage to generate movement through the processing unit;

driving the projection lens to move through the at least one moving stage;

disabling to drive of the processing unit;

magnetizing the at least one magnetic component through the processing unit; and the at least one magnetic component generating magnetic force to position the projection lens, wherein the carrier board has a through-carrier board opening, the through-carrier board opening is aligned with the through-base opening and the at least one through-stage opening, the carrier board is disposed on a rear side surface opposite to a front side surface of the base, and the at least one magnetic component is disposed through the base and abuts against the at least one moving stage, wherein the projection lens is connected to the at least one moving stage and passes through the at least one through-stage opening, the through-base opening and the through-carrier board in sequence and enters a body, the at least one moving stage is controlled by the processing unit.

17. The adjusting method of the moving apparatus of claim 16, wherein the carrier board has at least one elastic structure, the at least one magnetic component is respectively disposed corresponding to the at least one elastic structure, the at least one elastic structure provides a pushing force to the at least one magnetic component.

18. The adjusting method of the moving apparatus of claim 16, wherein the at least one moving stage includes a vertical moving stage and a horizontal moving stage, the vertical moving stage is disposed on the front side surface of the base, and is movable relative to the base along a vertical direction, the horizontal moving stage is disposed on a front side surface of the vertical moving stage, and is movable relative to the vertical moving stage along a horizontal direction.

19. The adjusting method of the moving apparatus of claim 16, wherein when the processing unit is driven, the processing unit transmits a current to the at least one magnetic component to achieve demagnetization through power-on operation, and then the processing unit activates at least one driving mechanism to drive the at least one moving stage, when driving of the processing unit is disabled, the processing unit stops driving the at least one driving mechanism, and then the processing unit stops transmitting the current to the at least one magnetic component to achieve magnetization through power-off operation, or the processing unit stop transmitting the current to the at least one magnetic component to achieve magnetization through the power-off operation, and then the processing unit stops driving the at least one driving mechanism.

* * * * *